United States Patent [19]

O'Brien et al.

[11] 4,390,806

[45] Jun. 28, 1983

[54] DYNAMOELECTRIC MACHINE ROTORS WITH MECHANICAL SEPARATORS

[75] Inventors: Kirk G. O'Brien, Schenectady; John A. DeBrita, Scotia, both of N.Y.

[73] Assignee: General Electric Company, Schenectady, N.Y.

[21] Appl. No.: 183,574

[22] Filed: Sep. 2, 1980

[51] Int. Cl.³ .............................................. H02K 1/22
[52] U.S. Cl. .................................. 310/261; 310/201; 310/61
[58] Field of Search .................... 310/61, 64, 65, 261, 310/216–218, 198, 201

[56] References Cited

U.S. PATENT DOCUMENTS 3,158,770 11/1964 Coggeshall et al. ............ 310/201 X
3,891,868 6/1975 Joyce ................................. 310/308
3,995,180 11/1976 Giles ................................ 310/61 X Primary Examiner—Donovan F. Duggan
Attorney, Agent, or Firm—Robert C. Kain, Jr.; John F. Ahern

[57] ABSTRACT

A rotor for a large dynamoelectric machine possesses abrasion prevention material between certain of the laminations in the rotor winding. In particular, while the rotor windings may generally be wound in a series-connected fashion, the use of adjacent parallel winding conductors requires the use of an abrasion prevention material disposed between adjacently lying parallel-connected conductors. The use of this material eliminates copper galling and the undesirable formation of copper particles.

8 Claims, 3 Drawing Figures

DYNAMOELECTRIC MACHINE ROTORS WITH MECHANICAL SEPARATORS

BACKGROUND OF THE INVENTION

This invention relates to dynamoelectric machines and in particular to the rotors of such machines which employ rotor windings having at least two adjacent winding laminations electrically connected in parallel.

In a large dynamoelectric generator, a rotor having field windings thereon is rotated within a fixed stator assembly. The rotor windings are configured so as to define a plurality of pole faces. Typically, this winding on the rotor is electrically energized through collector rings surrounding the rotor shaft. Electrical current flowing through the rotor windings produces a rotating magnetic field which, in turn, produces an electrical current in conductive windings in the stator portion of the machine during rotation of the rotor assembly. Such rotors generally operate at a rotational speed of either 1,800 or 3,600 rpm although other speeds are common outside the U.S. In large dynamoelectric machines, the electrical power rating is generally measured in hundreds of megawatts. Accordingly, there are significant cooling requirements associated with such machines. For example, the stator portion of a large generator is always cooled using water or some other liquid. However, cooling of the rotor is generally accomplished by employing an atmosphere of hydrogen gas. However, the cooling path actually followed by the hydrogen gas is generally dependent on other machine design features. Such features particularly include the number of machine poles. For example, a four-pole machine is typically cooled by means of radially directed channels through the conductive windings. On the other hand, two-pole machines are typically cooled by means of diagonally directed channels, such as those shown in U.S. Pat. Nos. 3,995,180 issued Nov. 30, 1976 to Walter B. Giles and 3,348,081 issued Oct. 17, 1967 to David M. Willyoung, both of which are assigned to the same assignee as the present invention. These patents are hereby incorporated herein by reference as background material for the present invention.

The rotor essentially comprises a substantially cylindrical rotor core with longitudinal slots along its outer circumference into which the rotor field windings are placed. There is typically one rotor winding for each pole in the machine. Each pole winding is disposed in several slots on either side of the pole face which is part of the rotor core. Each pole winding comprises conductors which are laid into the pair of slots closest to the pole faces at the bottoms thereof and subsequent winding layers are added to the pair of slots in the form of a helix until a position near the top of the slots is reached, after which the winding is continued in the next pair of rotor slots. In a similar fashion, these windings are arranged in a helix which descends one layer at a time until the bottoms of the second slot pair are reached. This winding scheme is repeated for the desired number of slot pairs. Likewise, the flow of current through these windings follows the conductive path just described. The conductors are typically flat copper bars with holes along the lengths thereof to accommodate the cooling method employed in each particular case. The holes in each bar are aligned with holes in adjacent bars to form the appropriate cooling channel. At the end portions of the windings, the conductive bars that run the length of the slot are connected by means of copper end sections to corresponding conductive bars located in a slot symmetrically disposed with respect to the pole face. Because the winding material is conductive, the series wound nature of the rotor pole windings must be preserved by disposing layers of insulation between adjacent copper layers in the slots. Furthermore, this insulation must also extend into the end winding regions of the rotor to keep the winding configured in a series connection. Thus, heretofore, each pole winding generally comprised a single series electrical circuit.

As noted above, cooling of the rotor is essential for large dynamoelectric machines. The aforementioned Willyoung patent describes one method of cooling the copper conductive winding of a two-pole machine, particularly in and along the longitudinal center of the rotor. However, cooling of the end winding regions is also important if proper operating characteristics are to be maintained. One method of providing cooling to the end regions of the rotor winding is to employ parallel-connected copper bars in the rotor winding slots. Furthermore, fabrication of the rotor windings and subsequent assembly of the windings into the rotor slots is facilitated by the use of electrically parallel but mechanically separate rotor slot bars. For example, a rotor winding bar that was X inches thick would be replaced by two rotor winding bars, each of which were X/2 inches thick. These bars are connected in parallel through a brazing process employed at the end of each slot. Additionally, near the ends of the winding bars there may be grooves in each bar which form a common channel when the rotor bar halves are fitted together. Since such bars are connected in parallel there is no need for insulating material between them.

However, it has recently been noted that if a dynamoelectric machine is so constructed, a problem of copper galling may exist. That is to say, certain accumulations of copper particles may occur because of mechanical abrasion between these parallel-connected copper laminations. For clarity, and ease of understanding, the term layer, as used herein and in the appended claims, refers to a series-connected pole winding portion; furthermore, the term lamination, refers to adjacent parallel-connected conductive winding portions; thus a layer comprises one or more laminations. It is these laminations which may contain longitudinally extending cooling channels.

During normal machine running at relatively high speeds, there does not appear to be a significant amount of movement between adjacent laminations. This is thought to be due to the large centrifugal forces which occur and which hold the rotor bars in a substantially fixed position. However, during certain times, the machine is not generating power and a small angular velocity of rotor motion is maintained by running the machine through a turning gear so as to prevent any bowing or deformation of the rotor forging. It is thought that this low-speed mode of operation may contribute to relative motion between adjacent parallel-connected laminations (not to be confused with the insulated series-connected layers). Since these laminations are at the same voltage along their lengths, there is no need to provide electrical insulation between them. Thus, they are in mechanical contact along the length of rotor slot. However, the relative motion between laminations may produce galling of the copper conductive material. The galling may result in an accumulation of copper particles which could eventually lead to electrical grounding problems in the rotor winding circuit. This galling is an unexpected occurrence. Nonetheless, it is still desirable to connect certain rotor winding bars in parallel for purposes of end winding cooling and also for ease of assembly.

SUMMARY OF THE INVENTION

In accordance with a preferred embodiment of the present invention, a rotor for a dynamoelectric machine comprises a slotted cylindrical rotor core, the slots of which contain rotor winding bars. Between winding layers insulation material preserves the series winding circuitry. Between adjacent winding laminations, however, there is also disposed an abrasion prevention material. There is also disclosed a method of preventing copper galling between adjacent laminations.

Accordingly, it is an object of the present invention to prevent copper galling between adjacent parallel-connected laminations of the rotor windings.

It is also an object of the present invention to prevent copper galling in rotor assemblies for dynamoelectric machines.

It is also an object of the present invention to prevent the formation of copper particles within the rotor slots. The above objects and further objects of the present invention are accomplished without sacrificing the end cooling capacities of the rotor windings and without sacrificing the use of laminations which facilitate the placement of the winding within the rotor slots.

DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
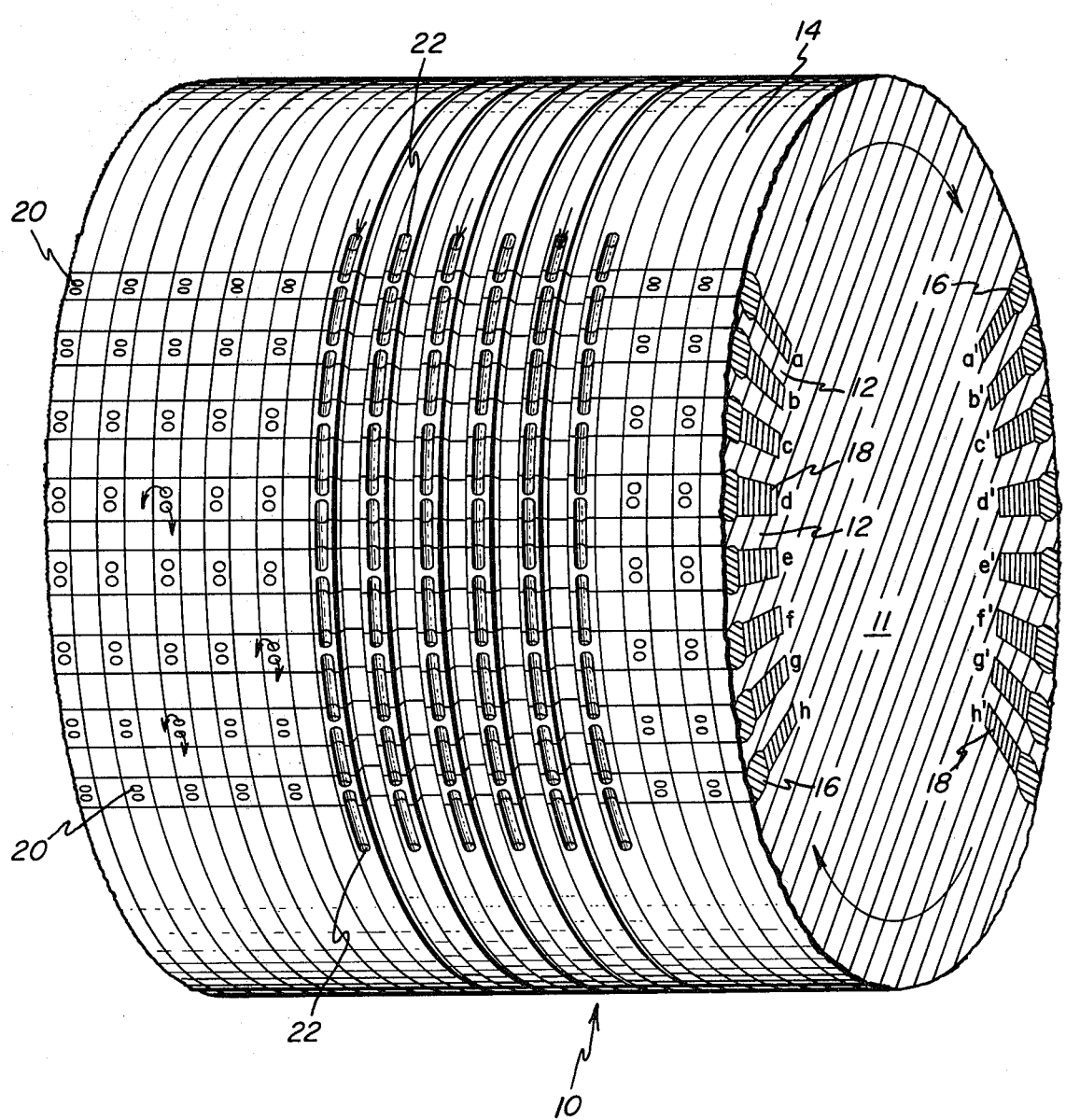
FIG. 1 is a perspective view of a dynamoelectric machine rotor illustrating the environment of the present invention.

FIG. 1 illustrates a rotor assembly 10 for a two-pole dynamoelectric machine. It is in such a machine that the present invention may be employed. The rotor assembly comprises a core 11 which is substantially cylindrical and possesses slots 18 therein extending in a longitudinal direction at the circumferential periphery. The rotor core 11 preferably comprises a magnetically permeable material, such as steel. These rotor cores are currently the world's largest steel forgings. The slots 18 are defined by rotor teeth 12. The windings for pole 14 are placed in slots a and a', b and b', c and c', and d and d'. The windings for the opposite pole are placed symmetrically in the other slots in a similar fashion. The layers are placed in slots a and a', b and b', c and c', and d and d' and connected so as to form a conductive path which proceeds, in layers, from the bottom to the top of slots a and a', then from the top to the bottom of slots b and b', then from the bottom to the top of slots c and c', and finally from the top to the bottom of slots d and d' which constitute the last slots used for the winding for pole 14 in the embodiment shown. A similar winding structure is employed for the opposite pole.

Because of the high currents carried and because of various electrical and magnetic heating effects, it is highly desirable that the rotor assembly 10 be cooled to ensure long-term reliability. For this purpose, aligned ventilation holes are provided in the copper winding bars and the rotor is disposed within a sealed hydrogen atmosphere. Furthermore, the uppermost portion of the slots are fitted with scoop fittings 22 which operate to pump hydrogen through holes in the winding bars as the rotor assembly 10 is rotated, for example by a steam turbine. Thus, hydrogen gas is scooped into openings 22 and is forced to exit openings 20 to provide a desired cooling function. Because of the ventilation holes in the winding bars, similar holes are provided in the material of the present invention so as not to prevent the flow of this cooling fluid. Such holes are presently provided in the electrical insulation between various winding layers.

Figure 2:
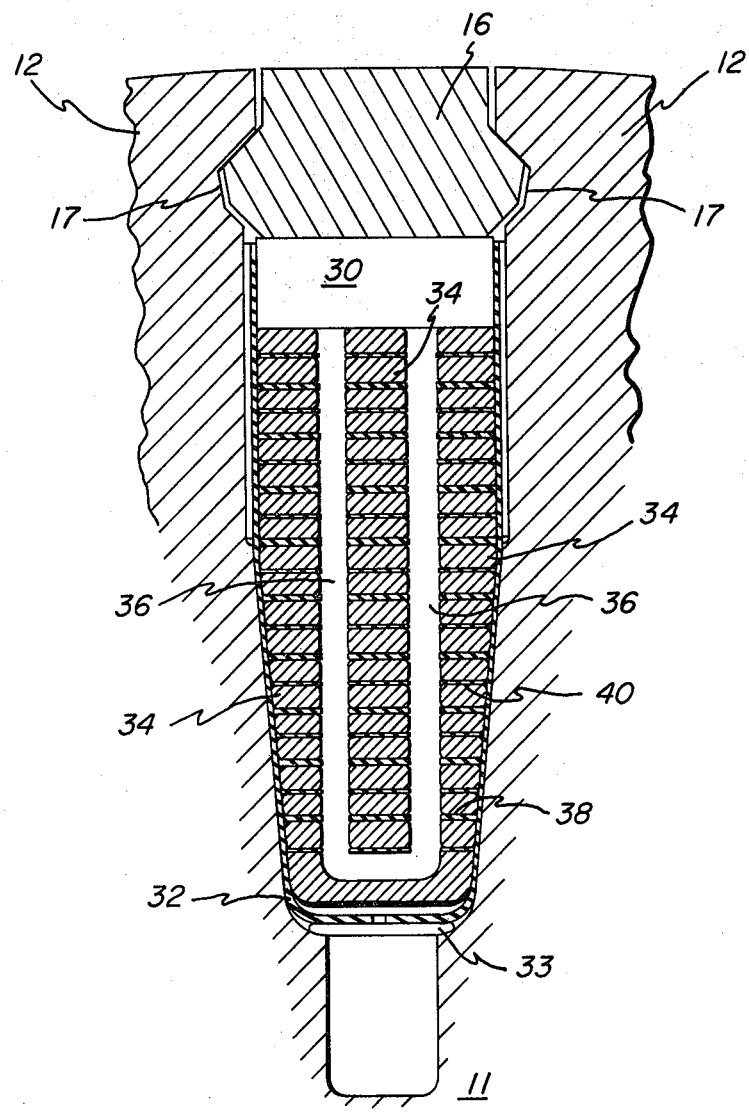
FIG. 2 is a cross-sectional view of a rotor slot showing windings installed therein in accord with the present invention.

FIG. 2 illustrates the invention in place in a single rotor slot. The slot occurs between rotor teeth 12 extending from rotor core 11. The copper conductors are generally indicated by reference numeral 34. As can be seen, between winding layers there is disposed winding insulation 38. This insulation is typically approximately 13 mils thick. Also shown between winding laminations is abrasion prevention material 40. The abrasion-resistant material is typically approximately 5 mils thick. The abrasion prevention material prevents the formation of copper particles arising from relative motion of the copper laminations. The copper laminations require no electrical insulation since they are connected in parallel. However, the winding insulation 38 is necessary to ensure a fully operating series wound coil. The insulation 38 and the abrasion prevention material 40 are generally configured as thin strips of material having approximately the same shape as the rotor winding bars 34 themselves. However, there is disposed through both the insulation 38 and the abrasion prevention material 34 slots or holes corresponding to similarly located slots and holes in the copper bars 34 so as to form fluid coolant channel 36.

Because it is also necessary to insulate the conductive windings 34 from the conductive rotor core, it is necessary to provide slot armor 32 which is typically composed of a fiberglass reinforced epoxy material. Likewise, to insulate the windings from the conductive wedge 16 an insulating creepage block 30 is employed as shown. The wedges 16 act to maintain the windings within the slot particularly during normal high-speed operation of the machine. Wedges 16 form a dovetail fit along channels 17 provided in the rotor teeth 12. The wedges 16 typically comprise either a steel or aluminum alloy. Such alloys are generally required because of the large centrifugal forces to which the wedge is subjected. The slot is preferably tapered to be narrower at the bottom, so as to provide greater strength to the rotor teeth 12, particularly near the roots of the teeth.

Figure 3:
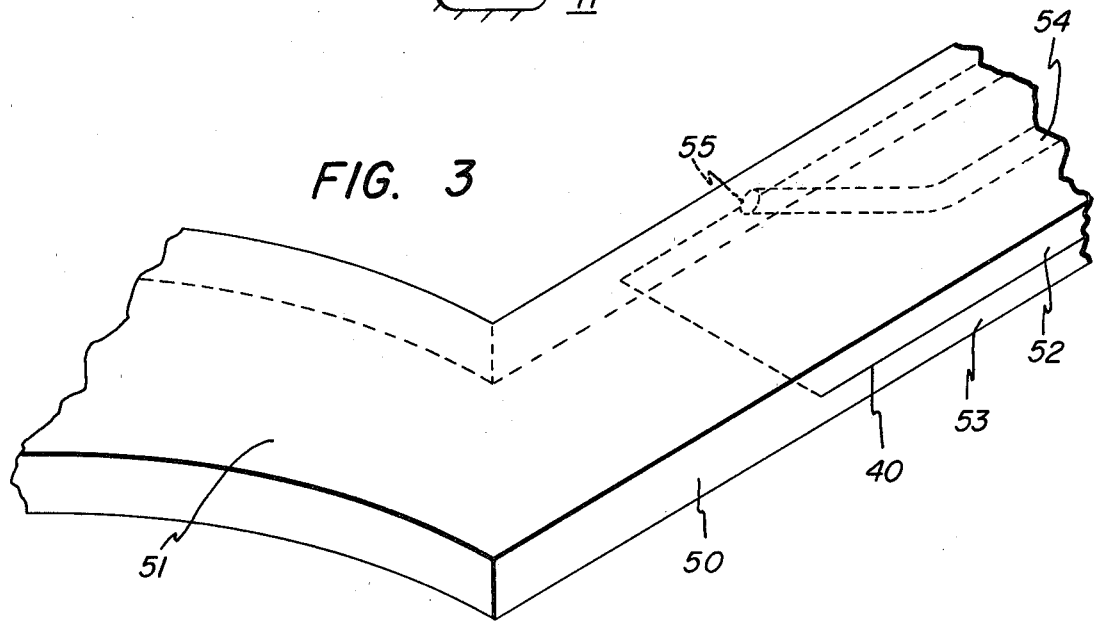
FIG. 3 is a perspective view illustrating a pair of rotor bar laminations in the vicinity of a corner of the rectangular winding pattern.

FIG. 3 illustrates an end portion of a single layer of a rotor winding. In the winding portion extending the length of the slot there are two physically and mechanically separate laminations 52 and 53. Each of these laminations is brazed together along section 50 as indicated. The use of separate laminations permits the machining of a groove in each of the copper laminations 52 and 53 such that when disposed in a back-to-back adjacent relationship as shown, cooling duct 54 is formed having openings 55 through which cooling fluid is forced by the action of the turning motion of the rotor. Moreover, the use of laminations 52 and 53 facilitates the assembly of the winding within the rotor slots. However, as indicated above, it is now known that it is desirable to incorporate an abrasion prevention material between laminations 52 and 53 to prevent copper galling and the formation of copper dust. The abrasion prevention material does not need to function as an electrical insulator since the laminations 52 and 53 are in parallel electrical connection and no significant voltages develop between these laminations along the length of the rotor slots. Accordingly, the material 40 disposed between laminations 52 and 53 need not serve an electrically insulating function.

As indicated above, FIG. 3 illustrates a corner portion of a winding layer. This portion also includes arched section 51 which extends over to the winding layer in the corresponding slot on the other side of the pole. The curved section 51 likewise is brazed to the straight section of the winding layer which extends through the rotor slot. While FIG. 3 shows abrasion prevention material 40 extending into the end portion of the slot bar which has cooling channel 54, it is to be noted that, in the preferred embodiment, this material does not extend into the channeled portion of the layer.

The abrasion prevention material 40 of the present invention preferably comprises CONOLITE which is a fiberglass reinforced polyester material. However, fiberglass reinforced epoxy or other suitable material may also be employed as long as abrasion between copper laminations is prevented. The CONOLITE material is obtainable from LOF, Inc., located in Carpentersville, Illinois. In one contemplated embodiment of applicants' invention in which the abrasion prevention material is disposed in a large generator, the abrasion prevention material is preferably approximately 5 mils in thickness. Its other dimensions correspond substantially to the conductive rotor winding bars themselves including any cooling holes formed therein. Additionally, the abrasion prevention material is preferably fixed in place between laminations by means of a suitable adhesive.

From the above, it may be appreciated that the abrasion prevention material of the present invention disposed between parallel-connected rotor winding laminations prevents the formation of copper particles and accordingly eliminates any of the problems that might be associated with it. It is to be particularly noted that the present invention also extends to the case in which there are a plurality of laminations connected in parallel rather than just the two laminations which are illustrated in FIG. 3. Moreover, the advantages of the present invention may be readily achieved without significant machine changes and the invention is readily installed as the rotor winding is placed in the slots or during fabrication of the rotor winding.

While the invention has been described in detail herein in accord with certain preferred embodiments thereof, any modifications and changes therein may be effected by those skilled in the art. Accordingly, it is intended by the appended claims to cover all such modifications and changes as fall within the true spirit and scope of the invention.

The invention claimed is:

1. A rotor for a dynamoelectric machine comprising:
a cylindrical core of magnetically permeable material having longitudinal slots along the outer periphery thereof;
a plurality of series-connected conductive windings disposed in layers within said longitudinal slots, said layers being maintained in series connection by electrical insulation disposed between said layers in which at least one of said layers comprises at least two parallel-connected laminations; and
an abrasion prevention material disposed between said parallel-connected laminations and having a thickness and composition unrelated to the electrical conductivity between said laminations and said abrasion prevention material is effective to prevent galling between said laminations in the event of relative motion therebetween.

2. The rotor of claim 1 in which said abrasion preventive material is selected from the group consisting of fiberglass reinforced epoxy, fiberglass reinforced polyester, or suitable plastic.

3. The rotor of claim 1 in which the slots have longitudinal channels therein near the radially outer periphery thereof for the insertion of wedges to retain said windings.

4. The rotor of claim 3 in which there is an insulating creepage block disposed between said wedges and said conductive layers.

5. The rotor of claim 1 in which the windings have aligned holes therein for the passage of cooling fluid.

6. The rotor of claim 1 in which said abrasion prevention material is fixed in place with adhesive.

7. A dynamoelectric machine comprising:
the rotor of claim 1;
a stator assembly with conductive windings from which electrical energy is provided.

8. The dynamoelectric machine of claim 7 further including excitation means for energizing said rotor windings.

* * * * *